United States Patent Office 3,256,750
Patented June 21, 1966

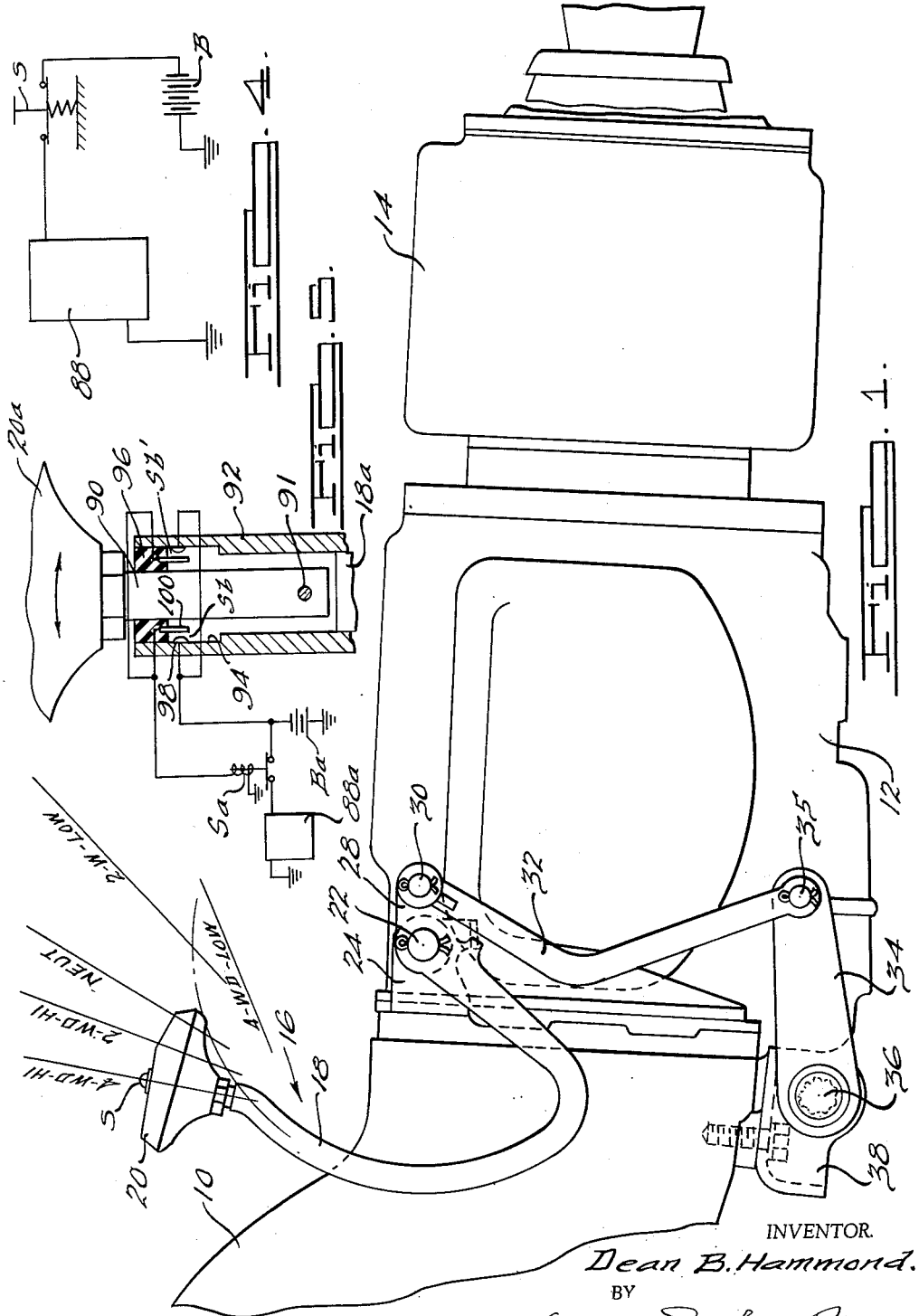

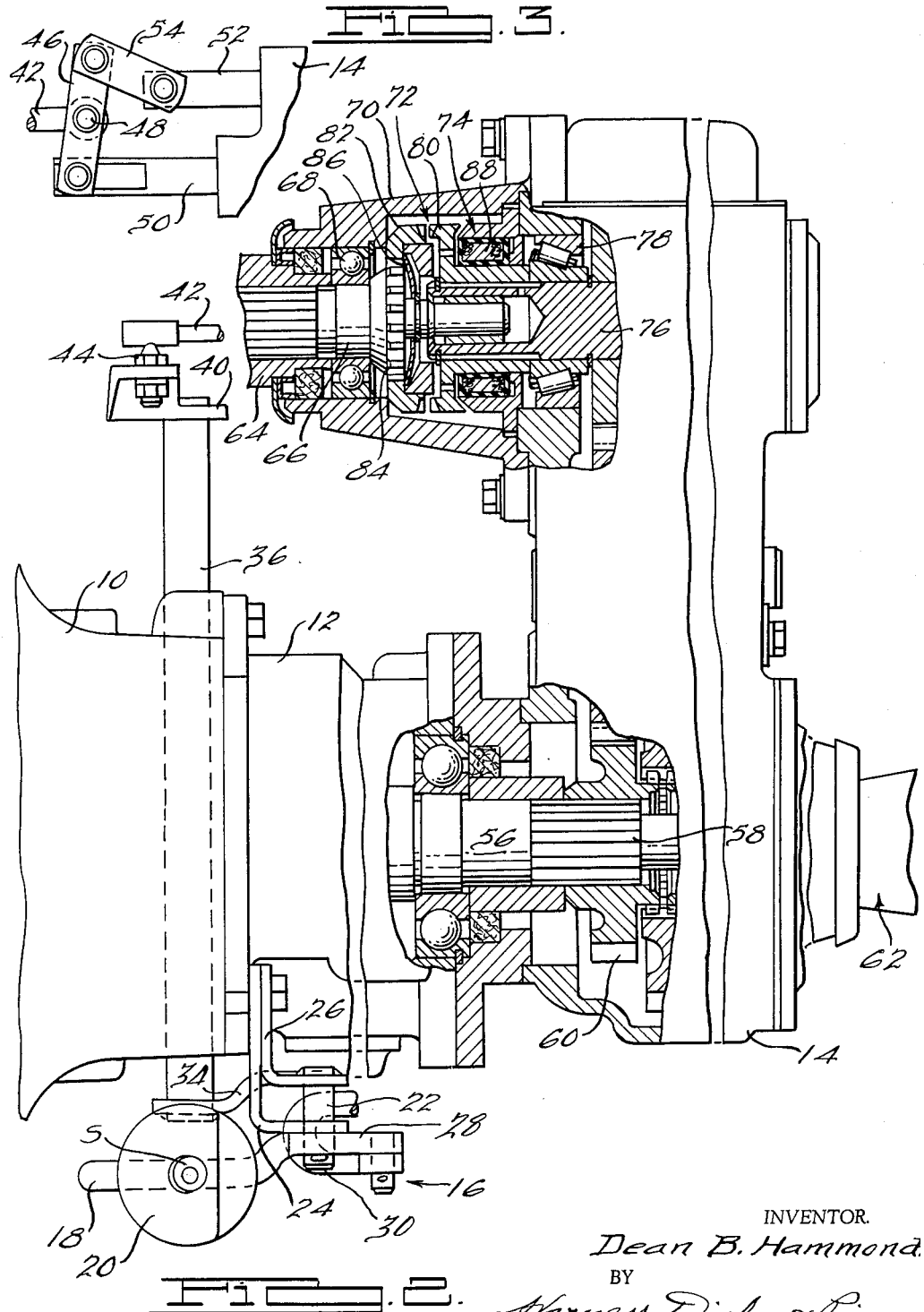

3,256,750
TRANSFER CASE SHIFT SYSTEM
Dean B. Hammond, Ann Arbor, Mich., assignor to Kaiser Jeep Corporation, Toledo, Ohio, a corporation of Nevada
Filed Oct. 21, 1963, Ser. No. 317,730
9 Claims. (Cl. 74—665)

This invention relates to transfer case shift mechanisms and specifically a shift mechanism for a transfer case of the gear type.

Very often in shifting a transfer case of the gear type from one gear range to another, high shift efforts are required by the operator. The shifting is accomplished by sliding gear members along splined connections and by sliding mating gear teeth relatively to each other. The frictional forces in the splined connections and between mating teeth of the members to be moved relative to each other must be overcome to accomplish shifting. If the front wheel drive shaft has a considerable windup the gears, etc., will be under load and these frictional forces will be increased correspondingly. Under preload conditions the shifting forces can become substantial and at times require all the strength of the operator. It is an object of this invention to provide a shift mechanism or system in which the effort required to shift the transfer case is minimized.

With the apparatus of the present invention the windup of the front wheel drive shaft is relieved prior to shifting thereby eliminating frictional forces between gears, splines, etc., caused thereby. Therefore, it is another object of this invention to provide a shift mechanism or system whereby the windup in the front drive shaft is relieved prior to shifting.

Other objects, features and advantages of the present invention will become apparent from the subsequent description and the appended claims, taken in conjunction with the accompanying drawings, in which:

FIGURE 1 depicts a preferred embodiment of the present invention and is a side elevational view showing a transfer case shift linkage in assembly relationship with a clutch (partially shown), a transmission and a transfer case;

FIGURE 2 is a plan view of the apparatus of FIGURE 1 with some parts removed, others broken away and some shown in section;

FIGURE 3 is a fragmentary view showing the relationship between the shift linkage and the shift rods of the transfer case;

FIGURE 4 is an electrical schematic diagram of a circuit for the apparatus of FIGURE 1; and FIGURE 5 is a view showing a modification of the shift linkage apparatus of FIGURE 1 with a modified electrical circuit diagram.

Looking now to the drawings, the present invention is shown in conjunction with a power train for a vehicle; the power train extends longitudinally of the vehicle and includes a clutch 10 (partially shown), a transmission 12, and a transfer case 14. Since the details of the clutch 10, transmission 12, and transfer case 14 in no way constitute a part of the present invention only those details necessary to understand the present invention are shown. Thus the clutch 10 and transmission 12 can be of constructions well known in the art; the transfer case 14 is also of a conventional construction and for the purposes of discussion is of the gear type shown and described in the copending United States patent application of A. C. Sampietro and K. G. Matthews, No. 237,009, filed November 13, 1962, now Patent No. 3,221,574, issued December 7, 1965, specifically FIGURE 3 therein, and also shown and described in the United States patent application of E. F. Kaiser, No. 267,528, filed March 25, 1963.

A transfer case shift linkage is generally indicated by the numeral 16 and includes a generally U-shaped shift lever 18 which has a shift knob 20 at one end and which is pivotally supported at its opposite end on a rod 22 which is fixed to parallelly extending legs of a pair of L-shaped brackets 24 and 26, which brackets have their other legs overlappingly fixed to the housing of the clutch 10 (see FIGURE 2). The shift knob 20 is located within the driver compartment and the lever 18 extends through an aperture in the floorboard. The pivoted end of shift lever 18 has an ear portion 28 and a rod 30 is fixed thereto and pivotally supports a curved shift link member 32 at one end. The shift link member 32 extends downwardly from rod 30 and has its opposite end pivotally connected to one end of a crank arm 34 by way of a rod 35 fixed to crank arm 34. The opposite end of the crank arm 34 is fixed to one end of cross shaft 36 which is pivotally supported at that end in a bracket 38 fixed to the housing for clutch 10 and which extends transversely of the vehicle and is similarly rotatably supported at the opposite side of the clutch housing.

A crank arm 40 is fixed to the cross shaft 36 at its opposite end. The crank arm 40 extends upwardly from the cross shaft 36 and has its opposite end connected to one end of a shift link 42 by a ball joint assembly 44. The shift link 42 extends rearwardly of the vehicle and is connected to the center of a cross link 46 by a ball joint assembly 48 (see FIGURE 3). The transfer case 14 has a pair of shift rods 50 and 52 with shift rod 50 pivotally connected to one end of cross link 46 and with the shift rod 52 pivotally connected to an intermediate link 54 which in turn is pivotally connected to the opposite end of cross link 46. The shift rods 50 and 52 are operable to shift the transfer case 14 in the manner described in the patent application of Kaiser, supra, it being sufficient for the purposes of the present invention to indicate that movement of rods 50 and 52 and hence shifting of the transfer case 14 occurs as a result of the translational movement of the shift link 42.

Thus when the shift lever 18 is pivoted about rod 22, the link member 32 is moved causing the cross shaft 36 to be rotated via crank arm 34. At the opposite end, rotation of cross shaft 36 causes pivotal movement of crank arm 40 resulting in translational movement of shift link 42 and movement of shift rods 50 and 52 via cross link 46 and intermediate link 54. The rods 50 and 52 are moved to various shift positions in accordance with the amount of rotation of the shift lever 18. Thus clockwise rotation of the shift lever 18 from the position shown in FIGURE 1 shifts the transfer case 14 from four wheel drive high gear ratio successively to two wheel drive high gear ratio, neutral, two wheel drive low gear ratio, and four wheel drive low gear ratio.

In the apparatus shown power is delivered to both the front and rear wheels from the transmission 12 through the transfer case 14.

The transmission 12 has an output shaft 56 which terminates in a splined end 58 upon which a similarly splined drive gear 60 of transfer case 14 is supported. A rear wheel drive shaft assembly 62 (only partially shown) is driven through the transfer case 14 (as described in the patent application of Sampietro et al., supra, and Kaiser, supra) for delivering power to the rear wheels of the vehicle.

A yoke (partially shown) of a universal joint for a front wheel drive assembly is powered by the transfer case 14 for delivering power to the front wheels of the vehicle. As previously noted, in past constructions the transfer case was shifted by moving shift rods, such as rods 50 and 52, through the manipulation of a shift linkage such as linkage 16. Since the connection from the front wheel drive shaft to the transfer case was direct, any windup in that drive shaft resulted in a corresponding windup in the gears of the transfer case with the result that shift efforts were high. In the present invention means are provided between the front wheel drive shaft and the transfer case whereby the connection therebetween is broken prior to shifting, thus relieving windup and the connection is made again upon completion of the shift; with this construction shift efforts are minimized.

The yoke 64 is splined to a front wheel drive shaft 66 which is rotatably supported by a bearing 68 located in a housing extension 70 fixed to the transfer case 14 rather than a direct connection as previously provided. The shaft 66 is driven by the gears of transfer case 14 through a dog clutch assembly 72 activated by an electromagnet assembly 74. The electromagnet assembly 74 and dog clutch assembly 72 can be of types well known in the art and specifically as shown are of a construction similar to that shown in the application of Sampietro et al., supra. A spindle 76, rotatably supported in the transfer case housing by bearings, such as bearing 78, is connectible via gears to the output shaft 56. This geared connection is conventional and is as set forth in the above noted patent applications.

The dog clutch assembly 72 has an annular drive member 80 splined and fixed from axial movement via a lock ring to the end of spindle 76. An annular driven member 82 is splined to a flange 84 proximate the end of drive shaft 66; the latter splined connection is coarse; thereby facilitating axial movement between driven member 82 and flange 84. The drive member 80 and driven member 82 are provided with axially extending, circumferentially disposed confronting teeth which are matable with each other. In the position as shown in FIGURE 2 these teeth are not engaged and hence the front wheel drive assembly is not connected to the spindle 76. A spring assembly 86 including a circular, flat spring member biases the driven member 82 to a position out of engagement with the drive member 80. The electromagnet assembly 74 has a coil 88 which extends annularly about a portion of the drive member 80; upon energization of the coil 88 flux flows through a magnetic path linking both the drive member 80 and the driven member 82 and the driven member 82 is moved along the flange 84 by the resultant magnetic force and into engagement with the drive member 80. When the coil member 88 is de-energized the spring assembly 86 moves the driven member 82 out of engagement with drive member 80.

The circuit for the coil member 88 is shown in FIGURE 4. In the preferred embodiment the dog clutch 72 is normally engaged; hence, the coil member 88 is normally energized via a battery B for the vehicle. A normally closed switch S is located in the electrical line between the battery B and the coil 88, which switch S, in the preferred embodiment, is located in the shift knob 20. The actuating button for switch S extends slightly outwardly from knob 20 so that the operator can actuate switch S with his palm as the knob 20 is gripped. Thus the operator can selectively open switch S.

In operation, as the operator is about to shift the transfer case 14 of the vehicle, the shift knob 20 is grasped and the palm of the operator's hand actuates switch S deenergizing the coil 88. Any windup of the gears of the transfer case 14 as transferred thereto by windup of the front wheel drive shaft is immediately released as the connection between the front wheel drive shaft and the transfer case 14 is broken. Thus the shift can be made with a minimum of effort. After the shift has been completed and the operator has removed his hand from the shift knob 20 the switch S is automatically closed, via a spring, and the coil 88 energized and the connection from transfer case 14 to the front wheel drive shaft is again completed.

In a modified structure as shown in FIGURE 5, the circuit to the coil member is broken automatically in response to shift-effort on the shift linkage. In the embodiment of FIGURE 5, components similar to like components in FIGURES 1–4 are given the same number with a letter subscript. The shift knob 20a is connected to one end of a shaft 90 which is located within a connecting tube 92 and is pivotally pinned therein by pin 91 at its opposite end. The connecting tube 92 has an enlarged diameter bore 94 at the knob end and is fixed at its opposite end to the shift lever 18a. A soft rubber bushing 96 is located within the enlarged diameter bore 94 and surrounds the shaft 90. The bushing 96 has a low spring rate permitting pivotal movement of the shaft 90 via knob 20a about the pin 91. Since the pin 91 extends transversely of the plane of motion of the shift lever 18a any shifting motion applied to shift knob 20a results in pivoting of the shaft 90. A normally closed solenoid switch Sa is used in lieu of switch S and has its coil actuated by a pair of contact switches Sb and Sb'.

The switch Sb comprises an electrical contact button 98 fixed in the enlarged bore 94 below bushing 96 and in line with the pivotal motion of the shaft 90. A second contact 100 extends from the bottom of bushing 96 in line with the button 98. A similar switch Sb' is located diametrically oppositely from switch Sb. Upon shifting motion of the shift knob 20a in one direction, the bushing 96 is compressed and the switch Sb is closed energizing the coil of solenoid Sa causing its contacts to be opened and thereby opening the circuit to the coil member 88a. This disconnects the front wheel drive shaft from the transfer case 14 and permits shifting with minimum effort. When the shift is completed and the shift knob 20a released, the resilient bushing 96 returns the shaft 90 to center, opening the switch Sb whereby the connection between drive shaft and transfer case is again completed. Upon movement of the shift knob 20a in an opposite direction the switch Sb' is actuated and the same sequence of events occurs.

Thus with the apparatus as described, shifting efforts for a gear type transfer case are minimized.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A gear type transfer case assembly comprising: drive means for receiving rotational energy from a source, rear coupling means connectable to a rear wheel drive shaft assembly for delivering power thereto, front coupling means connectable to a front wheel drive shaft assembly for delivering power thereto, gear means suitable for connecting said drive means to said rear and said front coupling means, clutch means for connecting said gear means to said front coupling mean and actuable for disconnecting said gear means from said front coupling means, mechanical shift means connected to said gear means and selectively operable for shifting gear means and including switch means selectively actuable for actuating said clutch means whereby said front coupling means and hence the front wheel drive shaft assembly is disconnected from said gear means.

2. A gear type transfer case assembly comprising: drive means for receiving rotational energy from a source, rear coupling means connectable to a rear wheel drive shaft assembly for delivering power thereto, front coupling means connectable to a front wheel drive shaft assembly for delivering power thereto, gear means shiftable for connecting said drive means to said rear and said front coupling means, a magnetic clutch member selectively actuable for connecting and disconnecting said gear means and said front coupling means, mechanical shift means connected to said gear means and selectively operable for shifting said gear means and including an electrical switch electrically connected to said magnetic clutch and being selectively operable for actuating said magnetic clutch.

3. A gear type transfer case assembly comprising: drive means for receiving rotational energy from a source, rear coupling means connectable to a rear wheel drive shaft assembly for delivering power thereto, front coupling means connectable to a front wheel drive shaft assembly for delivering power thereto, gear means shiftable for connecting said drive means to said rear and said front coupling means, a magnetic clutch member actuable for connecting and disconnecting said gear means and said front coupling means, an electrical circuit connected to said magetic clutch member and having first and second conductive conditions for actuating said magnetic clutch member for connecting and disconnecting, respectively, said gear means and said front coupling means, a mechanical shift linkage connected to said gear means for shifting said gear means, an electrical switch member located on said linkage and electrically connected to said electrical circuit and being selectively movable between two positions for alternatively placing said electrical circuit in said first or said second conductive conditions.

4. A gear type transfer case assembly comprising: drive means for receiving rotational energy from a source, rear coupling means connectable to a rear wheel drive shaft assembly for delivering power thereto, front coupling means connectable to a front wheel drive shaft assembly for delivering power thereto, gear means shiftable for connecting said drive means to said rear and said front coupling means, a magnetic clutch member actuable for connecting and disconnecting said gear means and said front coupling means, an electrical circuit connected to said magnetic clutch member and having first and second conductive conditions for actuating said magnetic clutch member for connecting and disconnecting, respectively, said gear means and said front coupling means, a mechanical shift linkage connected to said gear means and including a shift lever manually movable by the operator for effecting shifting of said gear means, an electrical switch member located on said shift lever and being selectively movable between two positions for alternatively placing said electrical circuit in said first or said second conductive conditions.

5. A gear type transfer case assembly comprising: drive means for receiving rotational energy from a source, rear coupling means connectable to a rear wheel drive shaft assembly for delivering power thereto, front coupling means connectable to a front wheel drive shaft assembly for delivering power thereto, gear means shiftable for connecting said drive means to said rear and said front coupling means, a magnetic clutch member for connecting said gear means to said front coupling means when energized and for disconnecting said gear means from said front coupling means when deenergized, an electrical circuit electrically connected to said magnetic clutch member and energizing said clutch member when closed and deenergizing said clutch member when opened, a mechanical shift linkage connected to said gear means and including a shift lever manually movable by the operator for effecting shifting of said gear means, an electrical switch member located on said shift lever and electrically connected in said electrical circuit and being normally closed for closing said electrical circuit and being selectively movable to an open position for opening said electrical circuit.

6. A gear type transfer case assembly comprising: drive means for receiving rotational energy from a source, rear coupling means connectable to a rear wheel drive shaft assembly for delivering power thereto, front coupling means connectable to a front wheel drive shaft assembly for delivering power thereto, gear means shiftable for connecting said drive means to said rear and said front coupling means, a magnetic clutch member for connecting said gear means to said front coupling means when energized and for disconnecting said gear means from said front coupling means when deenergized, an electrical circuit electrically connected to said magnetic clutch member and energizing said clutch member when closed and deenergized said clutch member when opened, a mechanical shift linkage connected to said gear means and including a shift lever extending upwardly from the floor of the vehicle and manually movable by the operator for effecting shifting of said gear means, an electrical switch member located in a shift knob on the top of said shift lever and actuable by the palm of the operator's hand and electrically connected in said electrical circuit and being normally closed for closing said electrical circuit and being selectively movable by the pressure of the operator's palm on the shift knob to an open position for opening said electrical circuit.

7. A gear type transfer case assembly comprising drive means for receiving rotational energy from a source, rear coupling means connectable to a rear wheel drive shaft assembly for delivering power thereto, front coupling means connectable to a front wheel drive shaft assembly for delivering power thereto, gear means shiftable for connecting said drive means to said rear and said front coupling means, clutch means for connecting said gear means to said front coupling means and actuable for disconnecting said gear means from said front coupling means, a mechanical shift linkage connected to said gear means for shifting said gear means, switch means actuable responsively to shifting force on said shift linkage for actuating said clutch means whereby said front coupling means and hence the front wheel drive shaft assembly is disconnected from said gear means.

8. A gear type transfer case assembly comprising: drive means for receiving rotational energy from a source, rear coupling means connectable to a rear wheel drive shaft assembly for delivering power thereto, front coupling means connectable to a front wheel drive shaft assembly for delivering power thereto, gear means shiftable for connecting said drive means to said rear and said front coupling means, a magnetic clutch member actuable for connecting and disconnecting said gear means and said front coupling means, an electrical circuit connected to said magnetic clutch member and having first and second conductive conditions for actuating said magnetic clutch member for connecting and disconnecting, respectively, said gear means and said front coupling means, a mechanical shift linkage connected to said gear means and including a shift lever manually movable by the operator for effecting shifting of said gear means, electrical switch means located on said shift linkage and being normally in a first position and being movable responsively to a shifting force on said shift lever to a second position for alternatively placing said electrical circuit in said first or second conductive condition responsively to said switch means being in said one or the other of said first and second positions.

9. A gear type transfer case assembly comprising: drive means for receiving rotational energy from a source, rear coupling means connectable to a rear wheel drive shaft assembly for delivering power thereto, front coupling means connectable to a front wheel drive shaft assembly for delivering power thereto, gear means shiftable for connecting said drive means to said rear and said front coupling means, a magnetic clutch member for connecting said gear means to said front coupling means when energized and for disconnecting said gear means from said front coupling means when deenergized, an electrical circuit electrically connected to said magnetic clutch member and energizing said clutch member when closed and deenergized said clutch member when opened, a mechanical shift linkage connected to said gear means and including a shift lever manually movable by the operator for effecting shifting of said gear means, switch means located on said shift linkage and electrically connected in said electrical circuit and being normally in one position for closing said electrical circuit and being movable to a second position for opening said electrical circuit responsively to shifting forces on said shift lever.

References Cited by the Examiner

UNITED STATES PATENTS

| | | | |
|---|---|---|---|
| 2,214,819 | 9/1940 | Kiep et al. | 74—340 |
| 2,354,300 | 7/1944 | Bock | 74—665 |
| 2,846,036 | 8/1958 | Maurice et al. | 192—3.5 |

DAVID J. WILLIAMOWSKY, *Primary Examiner.*

HENRY S. LAYTON, *Examiner.*